April 29, 1969 — G. T. F. DIVINE — 3,440,743
UNDERWATER TRENCHING APPARATUS
Filed April 8, 1966

George T. Frederick Divine
INVENTOR
BY Kolisch & Hartwell
Attys.

United States Patent Office 3,440,743
Patented Apr. 29, 1969

3,440,743
UNDERWATER TRENCHING APPARATUS
George T. Frederick Divine, 3337 NE. 132nd Ave.,
Portland, Oreg. 97230
Filed Apr. 8, 1966, Ser. No. 541,231
Int. Cl. E02f 3/90, 5/28
U.S. Cl. 37—79                                    8 Claims

ABSTRACT OF THE DISCLOSURE

Underwater trenching apparatus including a hull, axial flow propellers under the hull adjacent its stern for producing current flow in a direction extending aft of the hull, a hinged diverter aft of the propeller hinged at its forward margin on the hull and swingable up and down to control the pitch of the current of water produced by the propellers, rudders aft of the propellers and forwardly of the diverter for controlling lateral flow, stream guides joined to the hull and projecting downwardly on opposite sides of the propellers forming with the hull a passageway bounding the current flow, and a system for controlling movement of the hull through the water independently of the propellers.

---

The present invention relates to an underwater trenching method and apparatus, and more particularly, to such a method and apparatus whereby a trench or channel may be produced in the bottom underlying a body of water.

The cutting of a trench in an ocean or lake bottom is an operation which is desirably performed under a number of different circumstances. Thus, such a trench might be required in order to enable a ship to come directly adjacent a shore for purposes of loading or unloading without being grounded. As another example, in construction projects, such as when laying a sewer pipe out to sea, a trench is required to receive the pipe which extends toward the sea from the shore line. Because of the presence of the water which overlies the bottom, the building of such a trench presents peculiar problems not shared by operations carried out on dry land.

A general object of this invention is to provide a novel method for cutting a trench in the bottom underlying a body of water, which is easily and rapidly performed without extensive preparatory construction required.

A related object is to provide novel apparatus facilitating the trench cutting method contemplated.

More particularly, an object is to provide trench cutting apparatus including a hull and water propulsion means for the hull, which propulsion means is employable to produce a current in the water floating the hull, the apparatus further including novel means for directing this current downwardly at the desired angle against the bottom thereby to produce cavitation in the bottom.

A related object is to provide in such apparatus means for controlling movement of the hull through the water to enable the location of the current of water producing cavitation in the bottom to be changed, whereby a channel may be cut in the bottom extending toward the shore from where cavitation first occurred.

Another object is to provide in such apparatus a novel power-operated diverter operatively mounted on the hull for controlling the pitch or slope of the water current produced by the propeller.

A further object is to provide in such apparatus a pair of novel current guides joined to laterally opposite sides of the hull, which guides, together with the bottom of the hull, form a passageway extending longitudinally of the hull defining the lateral dimension of the water current produced by the propeller.

Yet another object is to provide means for directing such a current of water laterally to one side or the other of the hull, thus to enable trenches of differing widths to be readily produced.

These and other objects of the invention will become more fully apparent as the description which follows is read in conjunction with the accompanying drawings, wherein.

Figure 1:
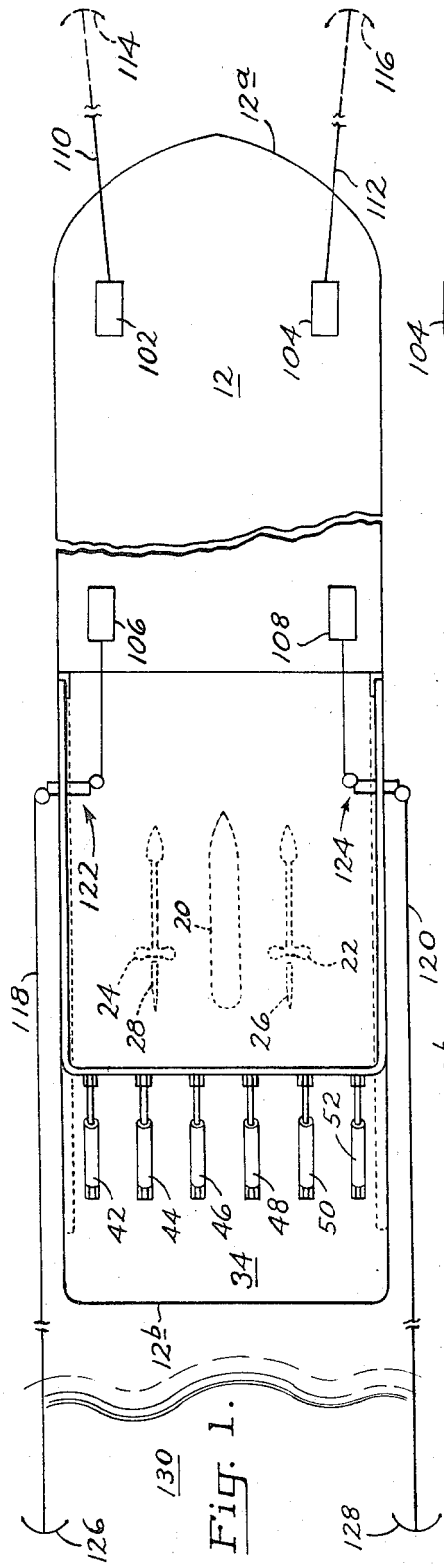
FIGURE 1 is a plan view of trenching apparatus as contemplated herein.

Referring to the drawings, the apparatus shown comprises a ship having a hull 12 with a bow indicated at 12a and a stern indicated at 12b. The hull is shown floating in a body of water having a level 13, above a bottom for the body of water shown at 14. The hull along opposite sides has a pair of elongated side skegs 18 which project downwardly from hull bottom 17. The hull further includes an elongated central skeg 20, located intermediate side skegs 18 adjacent the stern of the ship.

Mounted on the hull and projecting through the bottom thereof on laterally opposite sides of skeg 20 are a pair of power-driven propellers 22, 24, also referred to herein as water propulsion means. The propellers are driven by suitable engines (not illustrated) mounted within the hull, and when driven, they cooperate to produce a current in the water which floats the hull, which current flows in a direction extending from right to left in FIGS. 1 and 2.

Located directly behind propellers 22, 24, respectively, and projecting down from bottom 17 of hull 12, are a pair of rudders, 26, 28. These rudders, adjacent their forward extremities, are pivotally mounted on the hull for movement about substantially vertical axes. The rudders, which are also referred to herein as lateral diverting means, may be employed to direct a current produced by the propellers laterally to one side or the other of the hull.

Joined to laterally opposite sides of the hull, adjacent the rear ends of side skegs 18, are a pair of supplemental skegs such as the one shown at 30, also termed current guides. These skegs, together with that portion of hull bottom 17 which extends between the skegs, form what is called herein a passageway extending longitudinally of the hull through which a current of water produced by propellers 22, 24 may flow.

Figure 2:
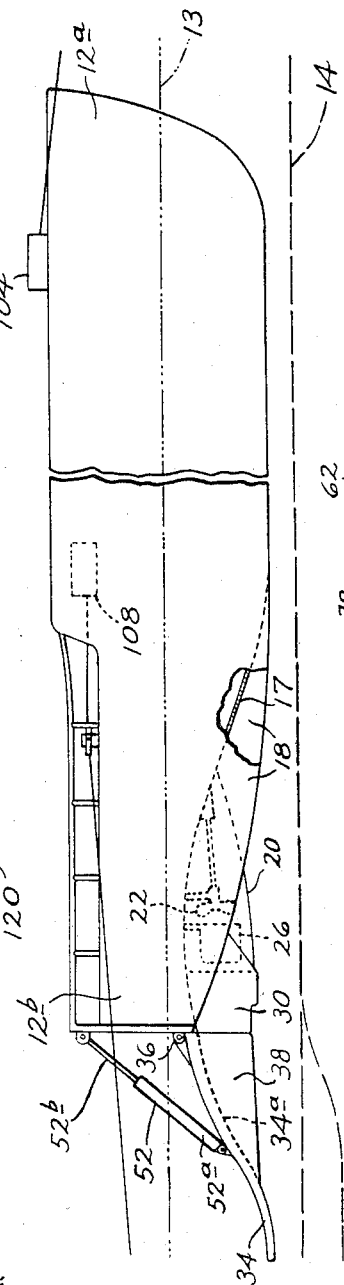
FIG. 2 is a side elevation of the apparatus shown in FIG. 1.

The apparatus further includes a diverter 34 for controlling the pitch of the current of water produced by the water propellers. This diverter comprises a large, somewhat S-shaped plate (as seen in FIG. 2), extending to the rear of hull 12. The diverter is hinged adjacent its forward edge to the bottom of the hull, through pivot mounting 36. The mounting enables the rear end of the diverter to be swung up and down about a horizontal axis extending transversely of the hull. Fastened to the bottom of the diverter adjacent laterally opposite sides thereof are substantially triangularly shaped side members such as the one shown at 38 forming continuations of skegs 30. In the drawings, the diverter is shown in a fully lowered position with the upright forwardly disposed edges of side members 38 abutting the upright rearwardly disposed edges of skeg 30. With the diverter in the lowered position shown, bottom surface 34a thereof forms a continuation of bottom 17 of the hull.

Power-operated means for swinging diverter 34 up and down comprises multiple fluid-operated double-acting rams 42, 44, 46, 48, 50, 52. Each of these rams includes the usual cylinder and extensible rod portions, such as cylinder portion 52a and extensible rod portion 52b in ram 52. Each cylinder portion is pivotally mounted on top of diverter 34 as shown, and ends of the extensible rod portions are pivotally mounted on the stern of the hull, in the manner illustrated. As can be seen in FIG. 1, the rams are spaced from each other transversely of the hull.

Figure 3:
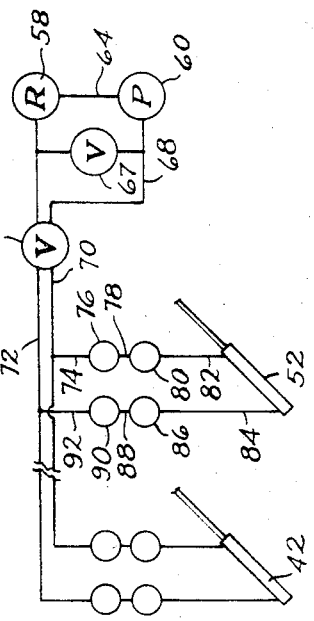
FIG. 3 is a schematic diagram illustrating portions of a fluid supply system employed in the apparatus of FIGS. 1 and 2.

The fluid system for supplying fluid under pressure to the rams is illustrated schematically in FIG. 3. To simplify the figure, only two of the rams utilized are illustrated, but it should be understood that the hydraulic circuitry for the other rams is similar to what is shown for rams 42, 52 in FIG. 3. The fluid system illustrated in FIG. 3 includes a reservoir for hydraulic fluid, shown at 58, a hydraulic pump 60, and a main control valve 62. The intake to the pump is connected to the reservoir by conduit 64, and connecting the discharge side of the pump to valve 62 is a conduit 68. A relief valve bypassing control valve 62 is shown at 67.

Conduits 70, 72 are provided connecting with main control valve 62 for the supply and exhaust of fluid from the rams. With valve 62 in one position of adjustment, the rams are extended by the introduction of fluid under pressure to one set of ends of the rams through conduit 72, and exhaust of fluid takes place through conduit 70. With valve 62 in another position of adjustment, the rams may be contracted, with fluid under pressure introduced through conduit 70, and exhaust of fluid from the rams taking place through conduit 72. Valve 62 has yet another position, where conduits 70, 72 are closed off from the pump and reservoir.

Considering an individual ram, as exemplified by ram 52, conduits 72 is connected to one end of the ram through a conduit 92, a shut-off valve 90, conduit 88, a flow control valve 86, and a conduit 84. Conduit 70 is connected to the other end of the ram through a conduit 74, a shut-off valve 76, a conduit 78, a flow control valve 80 and a conduit 82. The shut-off valves are normally left open and are included for the purpose of enabling a particular ram to be isolated from this system when such would be desirable, as for instance, for purposes of repair. The flow control valves are connected in the system so that they restrict the flow of fluid away from the ram while permitting unrestricted flow into the ram. By including the flow control valves, abrupt movements in the diverter, such as an abrupt lifting or dropping caused by wave action, is inhibited. These movements could be damaging to the apparatus during the intervals when adjustment in the diverter position is taking place, and fluid under pressure is being supplied to one set of ends of the rams from pump 60.

Referring again to FIGS. 1 and 2, means for controlling movement of the hull in the water as contemplated herein comprises a pair of laterally spaced forward winches shown schematically at 102, 104, and a pair of laterally spaced rear winches shown schematically at 106, 108 disposed somewhat behind the forward winches. The winches are suitably mounted on the hull adjacent the sides thereof. Each of these four winches, also referred to herein as take-up means, has the usual winch drum rotated under power by a motor.

Wound on the drums of the forward winches 102, 104 are elongated anchoring lines 110, 112, respectively. The lines have ends fastened to anchoring devices such as the anchors shown schematically at 114, 116. Wound on the drums of the rear winches are elongated anchoring lines 118, 120, respectively. These anchoring lines pass through fairlead assemblies 122, 124, and have ends connected to anchoring devices such as the anchors shown schematically at 126, 128.

Referring to FIG. 1, the anchoring lines are shown extended out from their associated winches, with anchoring devices 126, 128 anchored in a beach 130 bordering the body of water, and with anchoring devices 114, 116 anchored in the bottom underlying the body of water in a region located off the bow of the ship.

Considering now how the described trenching apparatus is operated to cut a trench, hull 12 is anchored off shore by the desired distance in the manner illustrated in FIG. 1, with the stern 12b of the ship pointing toward the shoreline. Propellers 22, 24 are operated to produce a current in the water floating the hull, and diverter 34 is operated by means of the fluid system and the rams to divert the current of water produced down toward the bottom whereby the current has the desired pitch relative to the bottom. Once the diverter is properly positioned, it may be locked in place by adjustment of valve 62.

If it is desired to have the current travel laterally to one side or the other of the hull, rudders 26, 28 may be swung appropriately to give the desired lateral direction to the current. In this respect the rudders constitute lateral diverting means.

When this current of water strikes the bottom, through erosion, it cavitates the bottom, with the sand or dirt removed settling on opposite sides of the cavity produced. To move the ship, forward winches 102, 104 are operated to pay out anchoring lines 110, 112, and rear winches 106, 108 are operated to take up anchoring lines 118, 120. This causes the hull to move in toward the shoreline. As the hull moves inwardly toward the shoreline, due to cavitation in the bottom, a continuous trench is cut extending in toward the shoreline from where the cavitation first started.

Thus, it will be seen that the invention contemplates a relatively simple and inexpensive method for cutting a trench along a bottom, such as an ocean bottom. The trench may be dug without extensive preparatory construction needed. By moving into the shoreline as the trench is being dug, a depth of water beneath the vessel is maintained sufficient to keep the same from being grounded. This enables a trench to be prepared which comes directly adjacent the shoreline.

It is claimed and desired to secure by Letters Patent:

1. Underwater trenching apparatus comprising a hull having an upwardly curved bottom portion, a power-operated axial flow propeller mounted under said portion of the hull and facing aft under the hull operable on actuation to produce a current of water flowing to the rear of the hull, a diverter aft of said bottom portion and the propeller and swingably mounted on the hull for up and down movement of its trailing end, said diverter having a lower surface which joins with said bottom portion and under which said current of water produced by the propeller flows, power-operated means connected to the diverter operable on actuation to swing the diverter and thereby control the pitch of the current of water flowing thereunder produced by the propeller, and a pair of stream guides joined to and projecting down from said hull in a region on either side of the propeller forming with the bottom of the hull a passage bounding the current of water produced by actuation of the propeller.

2. The apparatus of claim 1 which further comprises another power-operated propeller mounted under the hull, the first-mentioned and said other power-operated propeller being in substantial alignment in a transverse direction and being located adjacent opposite sides of the hull.

3. The apparatus of claim 1 which further comprises lateral diverting means mounted adjacent the bottom of said hull for controlling direction laterally of the hull in the current of water produced by said propeller.

4. The apparatus of claim 3, wherein said means for controlling lateral direction comprises a rudder positioned intermediate said stream guides and aft of the propeller.

5. The apparatus of claim 1, wherein said power-operated means comprises at least one fluid-operated ram operatively connected between said hull and said diverter, and wherein said apparatus further comprises a fluid system for supplying fluid under pressure to said ram and exhausting the fluid from the ram, said fluid system including a flow control valve restricting the exhaust of fluid from the ram.

6. The apparatus of claim 1 which further includes means for controlling movement of said hull through the water comprising multiple anchoring devices, an anchoring line connected to each anchoring device, and take-up means on the hull for each anchoring line operable on actuation to control the length of said line extending between the hull and the anchoring device connected to said line.

7. Underwater trenching apparatus comprising a hull, a power-operated axial flow propeller mounted under the hull and facing aft of the hull operable on actuation to produce a current of water flowing to the rear of the hull, a diverter swingably mounted on the hull for up and down movement of its trailing end, said diverter having a lower surface under which said current of water produced by the propeller flows, and said diverter being operable on being swung to control the pitch of the current of water produced by the propeller, lateral diverting means mounted under the hull aft of the propeller and forwardly of the diverter for controlling direction laterally of the hull of the current of water produced by operation of the propeller.

8. The apparatus of claim 7, which further comprises a pair of stream guides joined to and projecting down from said hull in a region on either side of the propeller forming with the bottom of the hull a passageway bounding the current of water produced by actuation of the propeller.

References Cited

UNITED STATES PATENTS

| | | | |
|---|---|---|---|
| 284,387 | 9/1883 | Cornelius et al. | 37—78 |
| 659,122 | 10/1900 | Bell | 37—79 |
| 723,122 | 3/1903 | Andersen | 37—78 XR |
| 726,213 | 4/1903 | Beer | 37—79 |
| 2,856,704 | 10/1958 | Hebert | 37—79 XR |
| 3,032,994 | 5/1962 | Lindell | 60—52 |
| 3,033,394 | 5/1962 | Kashergen | 214—138 |

ROBERT E. PULFREY, *Primary Examiner.*

CLIFFORD D. CROWDER, *Assistant Examiner.*